United States Patent [19]

Lebret

[11] Patent Number: 5,165,875

[45] Date of Patent: Nov. 24, 1992

[54] RECIPROCATING HYDRAULIC PUMP

[75] Inventor: Pierre Lebret, Le Chesnay, France

[73] Assignee: Bendix Europe Services Techniques, Drancy, France

[21] Appl. No.: 726,669

[22] Filed: Jul. 8, 1991

[30] Foreign Application Priority Data

Jul. 26, 1990 [FR] France ............................ 90 09559

[51] Int. Cl.⁵ .............................................. F04B 7/04
[52] U.S. Cl. ................................ 417/495; 417/554; 417/490
[58] Field of Search ................. 417/495, 554, 490

[56] References Cited

U.S. PATENT DOCUMENTS

| 2,404,502 | 7/1946 | Kehle | 417/554 |
| 2,612,837 | 10/1952 | Midgette | 417/554 |
| 4,484,866 | 11/1984 | Runkle | 417/495 |

FOREIGN PATENT DOCUMENTS

| 0069612 | 1/1983 | European Pat. Off. | 417/495 |
| 169287 | 1/1986 | European Pat. Off. | |
| 327218 | 8/1989 | European Pat. Off. | |
| 88821 | 3/1967 | France | |
| 305608 | 2/1933 | Italy | 417/495 |
| 356078 | 11/1937 | Italy | 417/495 |

Primary Examiner—Richard A. Bertsch
Assistant Examiner—Peter Korytnyk
Attorney, Agent, or Firm—Larry J. Palguta; Ken C. Decker

[57] ABSTRACT

The hydraulic pump comprises at least one reciprocating piston (2) sliding in a stationary cylinder (4). The piston (2) comprises, on the same side as the working chamber (10), a cylindrical skirt (22) which has the inside diameter of the cylinder (4) and in which is made at least one first port (18) putting the working chamber (10) in communication with the outer wall of the skirt (22). A second port (24) puts the duct (6) upstream of the valve (12) in communication with the outer wall of the piston (2). Finally, a slot (20) of a length at least equal to the distance separating the ports (18, 24) is made in the cylinder (4) so as to cause these ports (18, 24) to communicate over a specific zone of the reciprocating movement of the piston when the piston is sensibly at mid-stroke.

1 Claim, 1 Drawing Sheet

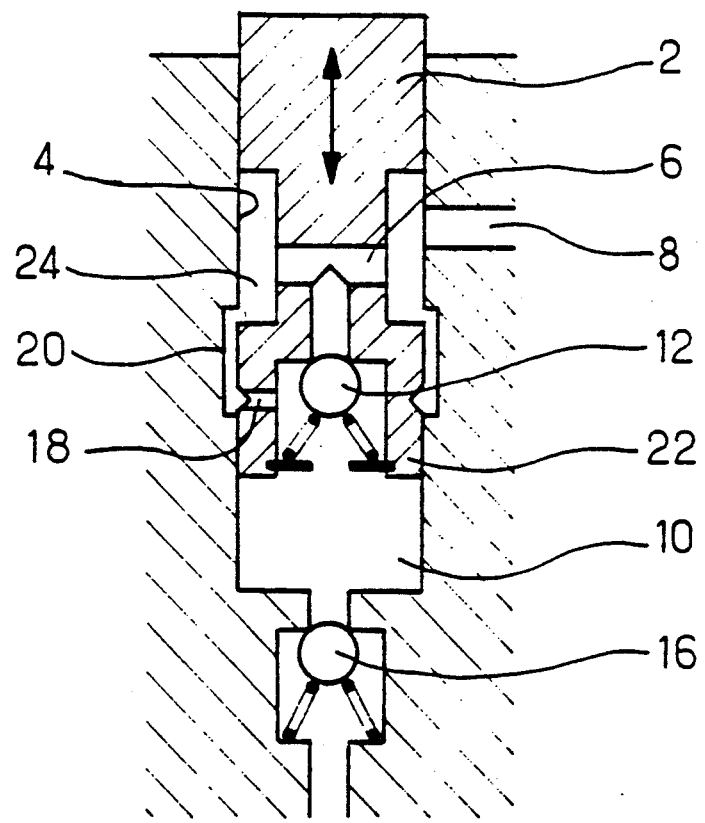

RECIPROCATING HYDRAULIC PUMP

SUMMARY OF THE INVENTION

An object of the present invention is to overcome this disadvantage by limiting the outlet pressure of the pump.

To achieve this, according to the invention, the piston comprises, on the same side as the working chamber, a cylindrical skirt which has the inside diameter of the cylinder and in which is made at least one first port putting the working chamber in communication with the outer wall of the skirt. A second port puts the duct upstream of the valve in communication with the outer wall of the piston, and a slot of a length at least equal to the distance separating the two ports is made in the cylinder so as to cause these ports to communicate over a specific zone of the reciprocating movement of the piston when the piston is sensibly at mid-stroke.

Preferably, the slot is a peripheral groove, the height of which, is, for example, substantially equal to the distance separating the ports.

Advantageously, the groove is made in such a way that the two ports communicate when the acceleration of the piston changes sign.

BRIEF DESCRIPTION OF THE DRAWINGS

The invention will now be described by way of example with reference to the accompanying drawing in which:

the single Figure shows a pump according to the invention diagrammatically in section.

DETAILED DESCRIPTION OF THE INVENTION

Referring now more particularly to this single Figure, a piston 2 slides in a reciprocating manner in a cylindrical bore 4, for example under the effect of an eccentric cam (not shown) controlled in the conventional way by an electric motor. This piston 2 is equipped with a suitable duct 6 for connecting via a conduit 8 a source of fluid under low pressure (not shown) to a working chamber 10 by means of a non-return suction valve 12.

In the example illustrated, this non-return valve 12 consists of a ball closing the duct 6 under the effect of a spring.

The working chamber 10 communicates with a user circuit by means of a non-return delivery valve 16 which, in the example illustrated, likewise consists of a ball loaded by a spring.

According to the invention, the piston 2 is extended, on the same side as the working chamber 10, by a cylindrical skirt 22 of an outside diameter the same as the inside diameter of the cylinder 4. Made in this skirt 22 is a port 18 putting the working chamber 10 in communication with the outer wall of the skirt 22.

Made upstream of the valve 12 is a port 24 putting the duct 6 in communication with the outer wall of the piston 2. In the example illustrated, this port 24 consists, in practice, of the groove making it possible to feed the pump and connected via the conduit 8 to the source of fluid under low pressure.

A slot 20 of a length at least equal to the distance separating the two ports 18, 24 is made in the cylinder. This slot is advantageously a peripheral groove, the height of which is substantially equal to the distance separating the two ports 18, 24.

Thus, when the pump is in operation, with the piston 2 executing its reciprocating translational movement for a time determined by the height of this groove 20, the working chamber 10 communicates with the low-pressure source.

By carefully selecting the position of the groove in relation to the stroke of the piston, this groove 20 makes it possible to limit the pressure in the working chamber. It will be chosen to arrange this groove in such a way that the two ports 18, 24 communicate when the piston is sensibly at mid-stroke, for example, at a maximum linear speed, this corresponding to a change of sign of the acceleration, in order to eliminate the pressure peak.

By likewise carefully selecting the height of the groove and therefore the duration of communication, the width of the limited pressure pulse can easily be adjusted. Finally, by carefully selecting the width of the ports and the depth of the groove, the subsequent pressure drop can be adjusted in a simple way.

An average person skilled in the art can make many changes and adjustments to the invention, without departing from its scope, as defined by the accompanying claims.

For example, the port 24 can consist of a radial duct of the piston 2 connecting the duct 6 upstream and in the immediate vicinity of the valve 12.

What we claim is:

1. A hydraulic pump, comprising a cylindrical bore provided with a low pressure input and a high pressure output remote from the input, and a piston having an internal duct, a skirt and a non-return suction valve, said piston sliding in the cylindrical bore with a reciprocating movement by which the piston is successfully moved away from and brought nearer to said output during respective suction and delivery periods, the internal duct and the skirt disposed within the cylindrical bore and at respective parts of the piston associated with said input and output, the skirt opening in a working chamber defined by the piston and cylindrical bore and provided with at least one port establishing a communication between an inside and an outside of said skirt, and the non-return suction valve establishing selectively a communication between the input and the skirt through said internal duct during the suction period, the cylindrical bore including a peripheral groove and the piston including an annular recess in permanent communication with the internal duct, the peripheral groove dimensioned and arranged so as to cause said port to communicate with said recess and with a piston outer wall surface adjacent the port through said peripheral groove during a specific zone of the reciprocating movement of the piston when the piston is sensibly at mid-stroke.

* * * * *